Patented Oct. 22, 1940

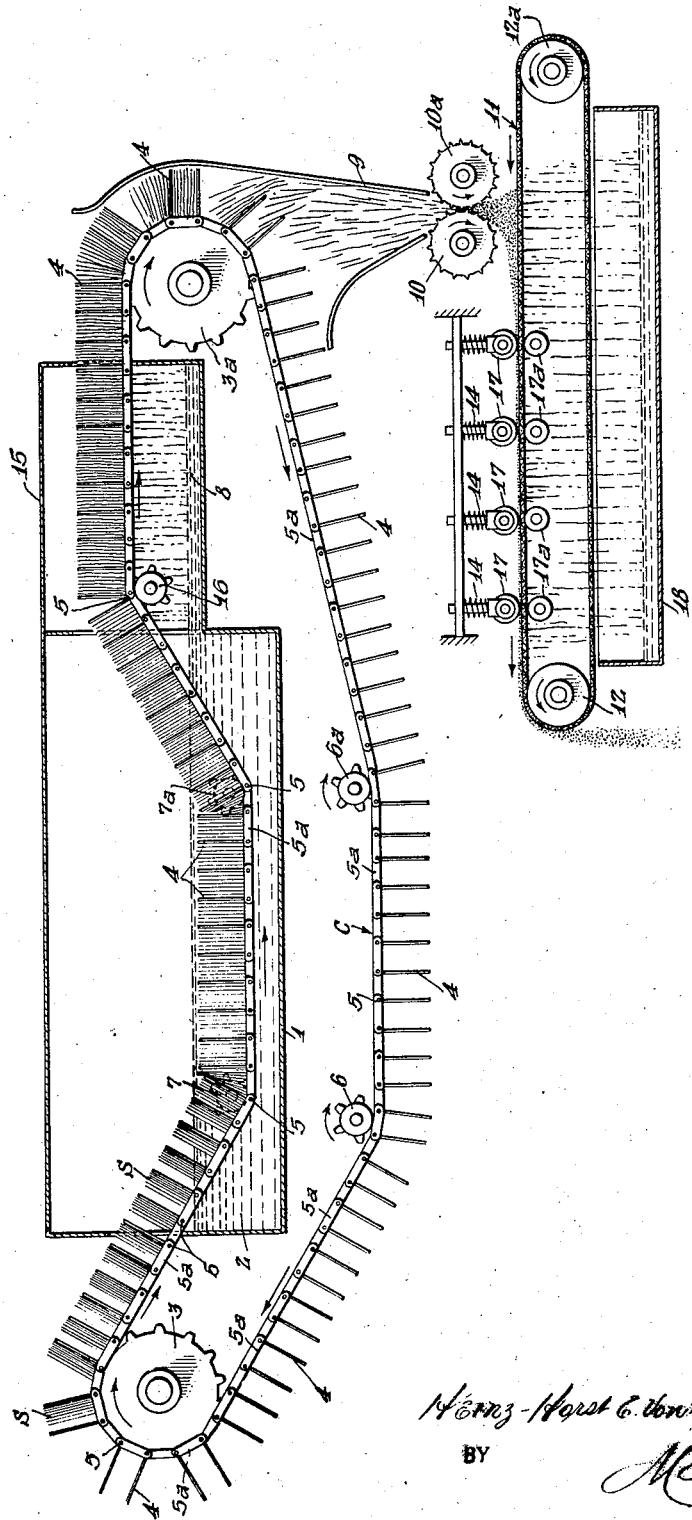

2,218,836

UNITED STATES PATENT OFFICE 2,218,836

MANUFACTURE OF ALKALI CELLULOSE

Heinz-Horst E. von Kohorn zu Kornegg, New York, N. Y., assignor to Oscar Kohorn & Co., Ltd., New York, New York, N. Y., a corporation of New York Application February 19, 1938, Serial No. 191,420

3 Claims. (Cl. 23—260)

This invention relates to the continuous manufacture of alkali cellulose of very homogeneous and uniform consistency. More particularly, it concerns itself with a method for the continuous conversion of cellulose-containing matters, varying in shape and consistency, into alkali cellulose, aged and unaged, of greater homogeneity and uniformity than hitherto produced.

The object of this invention is to preserve the continuity of the manufacture of alkali cellulose, without requiring a cellulose raw material in a special shape and without sacrificing the homogeneity and uniformity of the final product obtained.

The usual process employed in the manufacture of alkali cellulose, that is, viscose from cellulose is to steep sheeted cellulose in individual batches in vats containing a caustic soda solution of approximately 18% concentration. After the cellulose sheets have remained in this bath for about one hour, they are pressed immediately either in the same vat or in another pressing device, until the quantity of alkali solution remaining in the cellulose is such as to give the best conditions for the further treatments of the cellulose in the manufacture of viscose. Usually the quality of alkali left in the cellulose amounts to twice the weight of the dry cellulose used, and with the excess of alkali pressed out, the alkali-soluble celluloses, the so-called hemi-celluloses, and other impurities are removed. The steeped and pressed sheets are then shredded in a separate shredding machine and the resulting alkali cellulose "crumbs" are placed in suitable containers, where they are stored for about two days at a temperature of about 24° C.

The present invention constitutes an improvement of the manufacturing methods of alkali cellulose up to this point and all the subsequent operations in the manufacture of viscose, such as the treatment of the alkali cellulose with carbon disulphide, and the subsequent treatment of the xanthate produced with a caustic soda solution with the ultimate production of viscose, is substantially by the usual process.

Various suggestions have been made regarding a continuous or shortened manufacture of alkali cellulose, which, however, either proved difficult to apply in actual practice, or resulted in an inferior product, or required specially prepared and therefore costly raw materials.

The obvious problem in the continuous manufacture of alkali cellulose is, how to carry out four different operations, viz., steeping, pressing, shredding and aging of the cellulose in one continuous process. Steimmig, U. S. Patent No. 2,005,811 uses a continuous strip or web of cellulose which is treated in the following order: steeping, pressing and aging. The disadvantage of requiring a continuous strip of cellulose is that the thin strip of cellulose when steeped in alkali solution becomes very soft and tender and is apt to break very easily, thus disturbing the continuity of the process. Especially the pressing out of the excess alkali solution by squeezing rollers at the exit from the steeping solution gives rise to difficulties, as the heavy pressure exerted on the cellulose strip often causes the swelled and soft cellulose strip to break, which, besides interrupting the continuous working of the process, results in a changing and uneven alkali content of the cellulose after pressing.

In view of the disadvantages of the process set forth in U. S. Patent No. 2,005,811 above mentioned, the present invention provides for a different order of steps in the treatment of the alkali cellulose and without requiring the use of the cellulose raw material in a definite and continuous form.

According to the present invention the cellulose raw material in sheets, pieces, etc., is continuously conveyed on a suitable transport device through a caustic alkali solution of about 18% concentration. The time during which the cellulose is subjected to direct treatment of the alkali solution is long enough to permit the complete penetration and saturation of the cellulose with the solution. After a certain time, during which chemical reactions between the cellulose and the alkali take place, the same conveying device removes the cellulose from the outside influence of fresh alkali, leaving, however, the cellulose dripping wet with the alkali solution taken up by it during its treatment with said solution. The chemical reactions between the cellulose and the alkali taken up by the cellulose thus continue, but without the addition of fresh alkali from outside. The cellulose is left in this condition for a certain length of time, depending on the properties of the cellulose raw material and on the chemical changes and reactions intended.

The temperature at which the cellulose is treated with the 18% alkali solution as well as the temperature at which the cellulose is kept in dripping wet condition according to this invention depend on the degree of ageing to which the cellulose shall be subjected before sulfidizing. The temperature may vary between 10 and 60° C. in most cases, but is not limited by these figures. It affects to a large extent the viscosity of the viscose obtained later on.

After a certain length of time, during which the cellulose may or may not have been subjected to certain chemical changes due to the continued effect of the excess alkali solution present and due to the temperature applied, it is discharged from the above mentioned conveying device into a shredding or grinding device. This shredding or grinding device breaks the cellulose material, already in non-continuous shape, further up into crumbs or a powder-like mass. This device not only works continuously, but preferably also has a constant output per time unit.

The cellulose crumbs or the powder-like mass still containing an excess of alkali solution produced on the shredding device is then taken up by another conveyor and transported into a device or machine removing the excess alkali solution still contained in the cellulose to the required degree. This alkali removing device may consist of one or several sets of squeezing rollers, a continuously working centrifuge or any other suitable construction, by which the removal of the excess alkali is a continuous process co-ordinated with the operation of the rest of the machine.

After the cellulose has thus been transformed into a shredded mass of aged or unaged alkali cellulose, it is treated with carbon disulphide and dissolved into viscose in the usual manner.

It is known that the uniform content of alkali in the cellulose is of utmost importance in the manufacture of rayon, staple fibers, Cellophane and other cellulose derivatives, as it influences the uniformity of the xanthate, the viscose and the final product up to the last stages of production and use. According to the known methods, cellulose is treated with an excess of alkali solution, which is removed immediately after the cellulose has been sufficiently mercerized and purified. This removal of the excess of alkali solution is carried out on the cellulose in its original shape and in the form of batches, and is liable to be of various qualities, because of the difficulties in uniformly treating large batches, or batches of any kind. It is logical that any continuous mechanical treatment of bodies, such as cellulose, becomes increasingly uniform with a decrease in the structural size of the bodies under treatment, because it is easier to get a uniform product by subjecting a large number of small units to a continuous pressure than it is to subject a small number of large units to a uniform pressure.

Basing this invention on the above described fact, the cellulose after mercerization is shredded into a finely divided mass consisting of a multitude of particles. These particles are then freed of their excess of alkali by subjecting them to force or pressure in a continuously working device. Comparing this method with the known method of mercerizing large batches of cellulose sheets and then intermittently pressing these batches of 100-200 kg., it can be seen that according to the latter method, it is difficult to obtain a uniform alkali content throughout the cellulose batches after pressing, as compared with the individual but continuous pressing of many small cellulose particles.

As described above, by steeping the cellulose in the alkali solution for a certain length of time and then leaving the cellulose dripping wet with an excess of alkali solution for a further period of time, the reactions between the cellulose and the alkali continue according to this invention, to a strong degree after the cellulose has been removed from the alkali solution. This method results in a much more thorough utilization of the alkali solution applied, as compared with the known methods, where the excess of alkali is pressed out of the cellulose immediately after its exit from the alkali solution. If, for instance, according to the known methods a caustic alkali solution of 18% concentration is applied to the cellulose, this alkali solution has a concentration of still about 17.5% after it is pressed out from the cellulose.

According to the present invention the reactions between the cellulose and the excess alkali are allowed to continue for some time after its exit, from the alkali solution. Assuming that the same volume of 18% alkali solution is applied to the same quantity of cellulose, when the excess of alkali is finally pressed out from the cellulose after a possible aging time and after shredding, the concentration of this alkali solution is only about 16% or less. Thus, in order to obtain the same alkali content of the cellulose, only half or less of the volume of alkali solution need be applied, which greatly reduces operating and regenerating costs of the alkali solution used. It also makes it possible to reduce the steeping time considerably.

The accompanying drawing shows one possible form of the mechanism used in carrying out my improved process but it is obvious that the invention is not limited to this particular mechanism.

The apparatus used comprises a tank 1, which is preferably closed, save for openings in its end walls, through which the conveyor belt passes. Said tank 1 may contain a body of a suitable liquid which is ordinarily a solution of an alkali such as sodium hydroxide, but any other suitable solution may be used for mercerizing or for purifying the cellulose material.

The conveyor belt or chain C may be of any standard construction. It consists preferably of a plurality of links which are pivotally connected to each other by means of pivot pins 5. The endless chain or conveyor C may be of open or foraminiferous structure, so as to support the short sheets of cellulose material S, while permitting said sheets S to absorb the liquid 2 in the tank 1. The partitions 4 are rigidly connected in the usual manner to the links 5a of the chain so that said partitions in the course of their passage through the chamber 1 and auxiliary chamber connected therewith will remain perpendicular at all times to their respective links.

The chain C is provided with a suitable number of idler sprockets 6, in addition to the sprockets 3 and 3a. One or both of the sprockets 3 and 3a may be driven.

In the drawing, the inlet side of the machine is the left-hand side thereof. The operator places the cellulose sheets or bundles S so that they are supported upon the links 5a, between the partitions 4. It is to be understood that the endless conveyor may comprise two parallel rows of said links 5a, since the drawing is a diagrammatic side elevation. Each partition 4 will thus be riveted to a pair of parallel links 5a, in the parallel endless runs of the endless conveyor C.

The conveyor C passes through suitable openings which are formed in the end walls of the tank 1. Likewise the contour of said conveyor C, between the respective supporting members, is shown only diagrammatically, as in actual practice the portion of the conveyor C between the left-hand wall of the tank 1 and the adjacent idler 7 would not follow a straight line. However, the tension of the conveyor C is sufficient to maintain it in substantially a straight line, between the idlers 7 and 7a.

The cellulose sheets or bundles S are saturated with the solution 2, between the idlers 7 and 7a.

After having been saturated with the solution, the conveyor passes over an idler 16 and the conveyor C and the sheets S then pass through a chamber 15, which may be heated, the time of the heat treatment varying naturally with the speed of the conveyor. The chamber 15 may be omitted without departing from the invention.

The conveyor now deposits the sheets by gravity into the chute 9, from which the sheets are delivered to the cutting or shredding wheels 10 and 10a which are suitably power driven. The fine and uniform shreds of uniform material then fall upon the top run of a second endless conveyor 11, which is mounted on pulleys 12 and 12a, one or both of which may be power driven. The conveyor 11 may be of any suitable foraminiferous structure. The excess alkali solution is pressed out of the finely divided cellulose material by means of pressure rollers 17 and 17a which are mounted upon rods which are pressed downwardly under regulated pressure, by means of springs 14. Any suitable pressure means may be used. The liquid which is squeezed out of the shreds of material drops through the bottom run of the belt into the collecting tank 18. The shredded material is then removed from the conveyor at the member 12, by means of a scraping blade, blasted air, or any other suitable means.

It should be noted that although I have given a specific example of the treatment of cellulose, that the process will work at other temperatures with other concentrations of alkali than here given, and that the time of the operations mentioned may also be varied without departing from the spirit of the invention.

It should also be understood that in case ageing of the alkali cellulose is required, such ageing may be carried out on the alkali cellulose still containing an excess of alkali solution but after the shredding.

In most cases the temperature used will vary between 10 and 60° C. and the time of treatment will vary from twenty minutes to more than an hour, dependent upon the temperatures used, the concentration of alkali used and the like.

It should also be understood that the process may be worked with only a single tank. The tank 15 shown in the drawing can be dispensed with in which case naturally the time of submersion of the cellulose in the single tank will be longer, but the cellulose may be taken direct from this tank to the shredding apparatus.

As the cellulose at this stage is still saturated with alkali solution, it is very soft and requires much less power to shred than when shredded after the excess of alkali has been removed. The power saved by this method of "wet-shredding" as compared with the known methods, amounts to 30% or more.

After the shredding operation is concluded, the cellulose then passes between the sets of rollers 17 and 17a so as to squeeze the excessive alkali from the cellulose, and additional means for these rollers may be provided for the treatment of the shredded cellulose so as to provide a product with a uniform alkali content.

The rollers 17 and 17a are so adjusted that the cellulose after pressing should contain alkali solution amounting to approximately twice its original dry weight. By increasing the speed of the second belt conveyor 11 considerably over the speed of the first belt conveyor, it is possible to reduce the thickness of the layer of shredded cellulose to any required extent.

This provides a product of uniform alkali content. The shredded cellulose is then ready for conversion into viscose according to well known processes.

Two specific examples are given of temperatures and concentrations of solutions employed:

Example 1

The cellulose bodies are submerged in an alkali solution of 18% sodium hydroxide concentration for approximately twenty minutes at a temperature of 30° C. No oxidant is added to the alkali solution, as the increased degradation and polymerization of the cellulose caused by the oxidation has a weakening effect on the final product.

Also, the oxidizing and carbonizing effect of the air is harmful and it is desirable that cellulose after its exit from the alkali solution be protected from the air by being imbedded in the excess of alkali solution which it still retains on entering the second chamber.

The temperature in this chamber 15 is 40° C. and the cellulose bodies remain in this chamber for thirty minutes after which they emerge from this chamber still on the belt conveyor and containing an excess of alkali solution. The belt conveyor now passes around another pulley, thereby tilting the holders and discharging the cellulose bodies which drop into the shredding device. The crumbs produced in the shredding device are then freed of the excess alkali solution.

Example 2

Here the second tank is dispensed with. The cellulose bodies are transported on the belt conveyor into the chamber 1 containing a 19% caustic alkali solution. The temperature in the chamber as well as of the alkali solution is 40° C. and the time during which the cellulose remains inside the chamber is forty-five minutes.

It is understood that the alkali solution may be circulated by means of a pump, so as to provide a solution of constant composition, concentration, quantity and temperature. By the treatment above mentioned, no second chamber is necessary and the alkali cellulose bodies pass directly into the shredding device.

I have shown preferred embodiments of my invention, but it is clear that numerous changes and omissions can be made without departing from its spirit.

Having fully described my invention, what I claim is:

1. A plant for the continuous manufacture of alkali cellulose of very homogeneous consistency from cellulose material in non-continuous form, comprising first conveyor means to continuously treat cellulose material with alkali solution, means to continuously break up or shred cellulose material still containing an excess of alkali solution and second conveyor means to continuously remove or press out this excess of alkali solution, applied to the cellulose material for the purpose of mercerization and purification.

2. A plant for the continuous manufacture of alkali cellulose of very homogeneous consistency from cellulose material in non-continuous form, comprising first conveyor means to continuously treat cellulose material with alkali solution, means to contiuously age cellulose still containing an excess of alkali solution, means to continuously break up or shred cellulose material still containing an excess of alkali solution, and second conveyor means to continuously remove or press out this excess of alkali solution, applied to the cellulose material for the purpose of mercerization and purification.

3. Apparatus for the continuous manufacture of alkali-cellulose of very homogeneous consistency from cellulose material in non-continuous form, comprising a vessel containing caustic soda solution to mercerize and purify cellulose, a heating chamber to further treat and age the cellulose, an endless conveyor to carry cellulose through the caustic soda solution and through the heating chamber in dripping wet condition, means for tilting said conveyor in order to automatically unload said cellulose, means to continuously shred said cellulose and means to continuously remove the excess of caustic soda solution applied and still contained in the cellulose for the purpose of mercerization and purification.

HEINZ-HORST E. von KOHORN zu KORNEGG.